United States Patent
Ganmukhi et al.

[11] Patent Number: 5,850,399
[45] Date of Patent: Dec. 15, 1998

[54] HIERARCHICAL PACKET SCHEDULING METHOD AND APPARATUS

[75] Inventors: Mahesh N. Ganmukhi, Carlisle, Mass.; Tao Yang, Belleville, Canada

[73] Assignee: Ascend Communications, Inc., Westford, Mass.

[21] Appl. No.: 49,511

[22] Filed: Mar. 27, 1998

Related U.S. Application Data

[60] Provisional application No. 60/042,943 Apr. 4, 1997.
[51] Int. Cl.[6] .............................. H04L 12/28; H04L 12/56
[52] U.S. Cl. ........................ 370/412; 370/413; 370/415; 370/417; 395/200.57; 395/200.58
[58] Field of Search ...................................... 370/411, 412, 370/413, 414, 415, 416, 417–418, 428–429; 395/200.57, 200.58, 200.59

[56] References Cited

U.S. PATENT DOCUMENTS

| | | | |
|---|---|---|---|
| 5,463,620 | 10/1995 | Sriram | 370/412 |
| 5,499,238 | 3/1996 | Shon | 370/411 |
| 5,629,933 | 5/1997 | Delp et al. | 370/411 |
| 5,748,614 | 5/1998 | Wallmeier | 370/412 |

*Primary Examiner*—Chi H. Pham
*Assistant Examiner*—Steven Nguyen
*Attorney, Agent, or Firm*—Weingarten, Schurgin, Gagnebin & Hayes LLP

[57] ABSTRACT

A method of fairly and efficiently scheduling transmission of a packet from a plurality of sessions onto a network is presented. The method includes providing an input having a plurality of sessions, grouping the sessions into a plurality of classes, scheduling the classes with first level schedulers associated with one of the classes, scheduling the outputs of some of the first level schedulers with a second level scheduler, and prioritizing among the output of the remaining first level scheduler(s) and the output of the second level scheduler to provide an hierarchical scheduler output. The scheduler accepts traffic types at its input, and provides an output suitable for scheduling cell based traffic such as Asynchronous Transfer Mode (ATM) network traffic.

16 Claims, 2 Drawing Sheets

HIERARCHICAL PACKET SCHEDULING METHOD AND APPARATUS

CROSS REFERENCE TO RELATED APPLICATIONS

This application claims priority under 35 U.S.C. § 119(e) to provisional patent application Ser. No. 60/042,943 filed Apr. 4, 1997; the disclosure of which is incorporated herein by reference.

STATEMENT REGARDING FEDERALLY SPONSORED RESEARCH OR DEVELOPMENT

Not Applicable

BACKGROUND OF THE INVENTION

In any single scheduler methodology, such as the Packet Fair Queuing (PFQ) class of schedulers (described below) which include Virtual Clock (VC), Self-Clocked Fair Queuing (SCFQ), Start-time Fair Queuing (STFQ), Minimum Start Time Clocked Fair Queuing Plus (MSTCFQ+), Deficit Round Robin Fair Queuing (DRRFQ), Packetized Generalized Processor Sharing (PGPS), Worst Case Fair Weighted Queuing ($WF^2Q$) and Worst-case Fair Weighted Fair Queuing Plus ($WF^2Q+$) the scheduler is unable to fairly and efficiently handle a plurality of diverse traffic types or sessions.

VC schedulers monitor the average transmission rate of statistical data flows and provides every flow with a guaranteed throughput. Each user requests an allocation for the amount of traffic the user expects. The packets are then time stamped and placed in a queue according to the value of their time stamp. VC schedulers have a tight delay bound that is independent of the number of sessions involved in order to provide for delay minimization. However, VC schedulers do not allocate available bandwidth as fairly as other schedulers.

Self Clocked Fair Queuing (SCFQ) schedulers as well as Start Time Fair Queuing (STFQ) schedulers have a high degree of fairness for allocating bandwidth. However, they do not have the desired delay minimization since the virtual time is not strictly monotonically increasing, their delay bounds are proportional to the number of sessions involved.

The MSTCFQ+ scheduler is described in filed patent application Ser. No.09/049,510, titled High Speed Packet Scheduling Method and Apparatus and filed Mar 27, 1998, the disclosure of which is incorporated herein by reference. The MSTCFQ+ scheduler determines the virtual finish time of the packet by determining the transfer time required for the packet from its length and transfer rate, and adds this transfer time to the virtual start time of the packet. The packet with the smallest virtual finish time is then scheduled for transfer. The MSTCFQ+ scheduler provides an effective tradeoff between performance and complexity as compared to other schedulers.

DRRFQ schedulers have a high degree of fairness but are less effective when load balancing or distributed queues are used.

The $WF^2Q$ and $WF^2Q+$ schedulers have both a high degree of fairness and also the desired delay minimization. Therefore the $WF^2Q$ and $WF^2Q+$ schedulers are not only fair but also have a tight delay bound that is independent of the number of sessions involved. However, the implementation costs of $WF^2Q$ and $WF^2Q+$ schedulers are high compared to other schedulers since the $WF^2Q$ and $WF^2Q+$ schedulers must perform two searches on each session; one search to determine the packet start times of the first packet in each session, and a second search to determine the packet start times of all backlogged packets in each session; whereas other schedulers typically perform a single search on the first packet of each session for determining the packet start times.

PGPS schedulers are similar to the $WF^2Q$ and $WF^2Q+$ schedulers, especially when utilizing packets having a small packet size, however the PGPS scheduler is better at minimizing worst-case session delay.

The diverse sessions provided to the scheduler may comprise voice, video or data transmissions, each having different Quality of Service (QoS) requirements and characteristics. There exists six classes regarding the QoS of traffic on networks such as an Asynchronous Transfer Mode (ATM) network. These six classes are Constant Bit Rate (CBR), real time Variable Bit Rate (rtVBR), non-real time Variable Bit Rate (nrtVBR), Available Bit Rate (ABR), Unspecified Bit Rate Plus (UBR+) and Unspecified Bit Rate (UBR). Each QoS class has different requirements which must be taken into account by the scheduler in order to provide the maximum efficiency for handling this class of traffic. As an example, the CBR class is typically used for high quality video, the rtVBR class for voice and video, the nrtVBR class for low-quality video, the ABR class for data with flow control, the UBR+ class for data with no flow control and the UBR class for low priority data such as E-mail.

Networks such as ATM networks are becoming more sophisticated and are expected to handle multiple connections organized as distinct sessions with various QoS requirements. It would be desirable to have a scheduler which can be implemented in a cost effective manner and handle the QoS requirements of different sessions fairly and efficiently.

BRIEF SUMMARY OF THE INVENTION

A hierarchical scheduler includes a first level of schedulers that matches a plurality of sessions having various Quality of Service (QoS) requirements with different schedulers which are best suited for a particular QoS class. A second level scheduler then schedules the outputs from certain ones of the first level schedulers. A third level scheduler schedules the remaining outputs the first level schedulers with the outputs from the second level scheduler to provide a hierarchical scheduler output. The hierarchical scheduler apportions bandwidth among sessions having different requirements in a fair and efficient manner according to the QoS requirements of the respective sessions.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
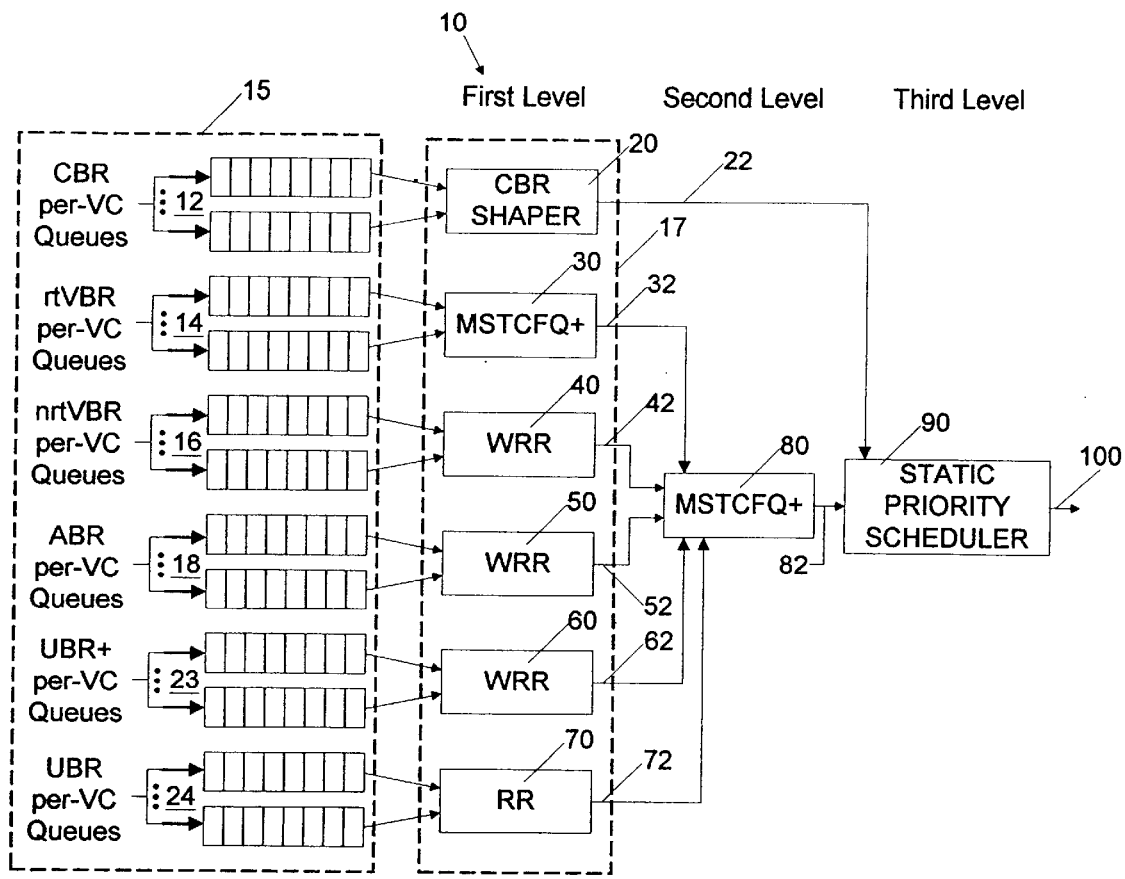
FIG. 1 is a block diagram of the hierarchical scheduler of the present invention.

An hierarchical scheduler 10 in accordance with the present invention is shown in FIG. 1. The hierarchical scheduler 10 comprises an input 15, a first level of schedulers 17, a second level scheduler 80 and a third level scheduler 90 for providing an output 100. The input 15 comprises packets from a plurality of sessions 12, 14, 16, 18, 23 and 24 which have different operating characteristics. The input sessions are grouped into classes according to their Quality of Service (QoS) which will be described in greater detail below. A first level of schedulers 17 comprises different types of schedulers 20, 30, 40, 50, 60, and 70. The outputs of a group of the first level schedulers 32, 42, 52, 62, and 72 are provided to a second level scheduler 80. The output of second level scheduler 80 is provided to a third level scheduler 90. The third level scheduler 90 also receives the output 22 of one of the first level schedulers 20. While one output from a first level scheduler is shown connected to the third level scheduler, it should be appreciated that any number of first level scheduler outputs could be connected to the third level scheduler, as well as any number of first scheduler outputs connected to the second level scheduler. The third level scheduler 90 provides an output 100.

The presently disclosed hierarchical scheduler is particularly useful in an ATM network since the hierarchical scheduler adapts the user traffic to the cell based network. The hierarchical scheduler supports different types of traffic at its input such as voice, video and data. The transmission requirements of voice, data and video are quite different, and each transmission type needs to be handled in a different manner in order to ensure the maximum efficiency and performance within such networks.

Voice and low quality video transmissions can more readily handle errors. If a single voice or low quality video cell is distorted the quality of the voice or video transmission is not severely affected, as long as the incidence of cell distortion is low and the flow is substantially continuous. In fact, a voice or video cell can occasionally be discarded without severely affecting the quality of the transmission. For example, cell loss of a duration up to approximately sixteen milliseconds is not very noticeable or disturbing to the listener or viewer. Voice and video transmissions must be substantially continuous despite the occasional distorted or discarded cell, and therefore require a short queue length in order to reduce delay. The short queue length can occasionally overflow with a resulting loss of packets. On the other hand, voice or video transmissions cannot tolerate excessive network delay since extensive delay may result in the voice or video transmission becoming incomprehensible to the listener or viewer.

In contrast to voice and video transmissions, data transmissions have a low or zero tolerance for errors since one distorted bit can change substantially change the data. Conversely, data transmissions have a high tolerance for network delay. Accordingly, data transmissions require the queue lengths to be longer to prevent packet loss in an overflow condition.

More specifically, the hierarchical scheduler need to provide session management in order to properly and efficiently manage the bandwidth of an ATM network. Each session must be individually serviced by the hierarchical scheduler in a fair and equitable manner. Session servicing by the hierarchical scheduler must provide appropriate delays and acceptable traffic losses according to the characteristics and requirements of each of the sessions. The hierarchical scheduler assures that delay-sensitive sessions such as video is sessions are serviced within 2 milliseconds, that voice sessions are serviced so as not allow the loss of traffic to exceed 1 to 10 percent of the samples, and that data sessions should not experience any data loss. Additionally, not only do the characteristics among types of transmissions such as voice, video and data vary, but the characteristics within a transmission type itself may also vary. Accordingly, these differences also need to be taken into account by the hierarchical scheduler. For example, a conventional 64 kbits per second voice call operates at approximately 166 cells per second, while a 32 kbits per second call operates at approximately 38 cells per second. For maximum fairness and efficiency these differences must also be considered.

Referring again to FIG. 1, there exist six QoS traffic classes on ATM networks. These six classes are Constant Bit Rate (CBR), real time Variable Bit Rate (rtVBR), non-real time Variable Bit Rate (nrtVBR), Available Bit Rate (ABR), Unspecified Bit Rate Plus (UBR+) and Unspecified Bit Rate (UBR). Each QoS has different requirements which must be considered by a scheduler.

The CBR class 12 has very stringent cell loss and delay requirements and requires the scheduler to provide a quality of service equivalent to that of a circuit in a circuit switching network. Accordingly, the CBR class connects directly to a CBR shaper 20 and the output 22 of the CBR shaper 20 is connected to the highest priority input of the priority element 90. The CBR shaper 20 is essentially a large First In First Out (FIFO) buffer which protects the network from bursty traffic. The output of the CBR class may include short bursts of traffic which are buffered by the CBR shaper and released at a controlled rate so as not to exceed downstream bandwidth limitations.

The sessions belonging to the rtVBR class 14 have stringent delay requirements but can tolerate certain levels of cell loss. Certain guarantees of delay bounds and non-zero cell loss ratios are associated with this class.

Sessions of the nrtVBR class 16 have less stringent cell loss requirements than the rtVBR class, but can tolerate certain levels of delay. This QoS also provides for guaranteed non-zero cell loss objectives.

Sessions of the ABR class 18 can tolerate certain levels of delay and loss. Associated with this QoS are guaranteed minimum throughput or minimum cell rates. Additionally, ABR sources may also adjust their transmission rates from time to time as required by a standard flow control algorithm implemented at each network node along the path of the connection.

Sessions of the UBR+ class 23 are similar to those of the ABR class 18 but they do not involve network flow control. The UBR class 24 of sessions do not have any specific loss, delay, or throughput requirements.

As an example, the CBR class is typically used for high quality video, the rtVBR class for voice and video, the nrtVBR class for low-quality video, the ABR class for data with flow control, the UBR+ class for data with no flow control and the UBR class for low priority data such as E-mail.

As shown in FIG. 1, for rtVBR sessions 14, a Minimum Start Time Clocked Fair queuing Plus (MSTCFQ+) scheduler 30 is used. The MSTCFQ+ scheduler determines the virtual finish time of a packet within a session by determining the transfer time required for the packet from its length and transfer rate, and adds this transfer time to the virtual start time of the packet. The virtual start time of the packet is set to the system virtual time when the packet was received. The packet with the smallest virtual finish time is then scheduled for transfer. The MSTCFQ+ scheduler, due to its effective tradeoff between performance and complexity as compared to other schedulers, provides the stringent cell delay requirements required by the rtVBR session.

A Weighted Round Robin (WRR) scheduler 40 is used for scheduling the nrtVBR packets since this class does not have stringent delay requirements and only expects the network to guarantee their specified minimum throughput, while being inexpensive to implement. For the same reasons, a second WRR scheduler 50 is used to schedule ABR packets and a third WRR scheduler 60 is used to schedule UBR+ packets.

For the UBR class 24 a simple round robin (RR) scheduler 70 is used since all the UBR sessions should be treated equally. Further, this scheduling hierarchy gives the network operator the flexibility to allocate any amount of bandwidth to support the UBR connections. RR schedulers are also inexpensive to implement.

At the second level of hierarchy a second MSTCFQ+ scheduler 80 is used. This scheduler 80 schedules between the first MSTCFQ+ scheduler output 32, the WRR schedulers outputs 42, 52 and 62, and the RR scheduler output 72. The MSTCFQ+ scheduler is again utilized due to its effective tradeoff between performance and complexity as well as being inexpensive to implement as compared to schedulers offering similar performance.

The static priority scheduler 90 gives the output 22 from the CBR shaper 20 the highest priority and the rtVBR, nrtVBR, ABR, UBR+ and UBR as a group priority below the CBR class. The CBR shaper 20 is responsible for per-Virtual Circuit (VC) shaping and is work non-conserving in that the CBR shaper 20 will allocate bandwidth whether or not it has cells pending. As such, the CBR shaper 20 wastes bandwidth if no cells are pending. Accordingly, the CBR class is given the highest priority while the delay sensitive queues are given the next highest priority.

Figure 2:
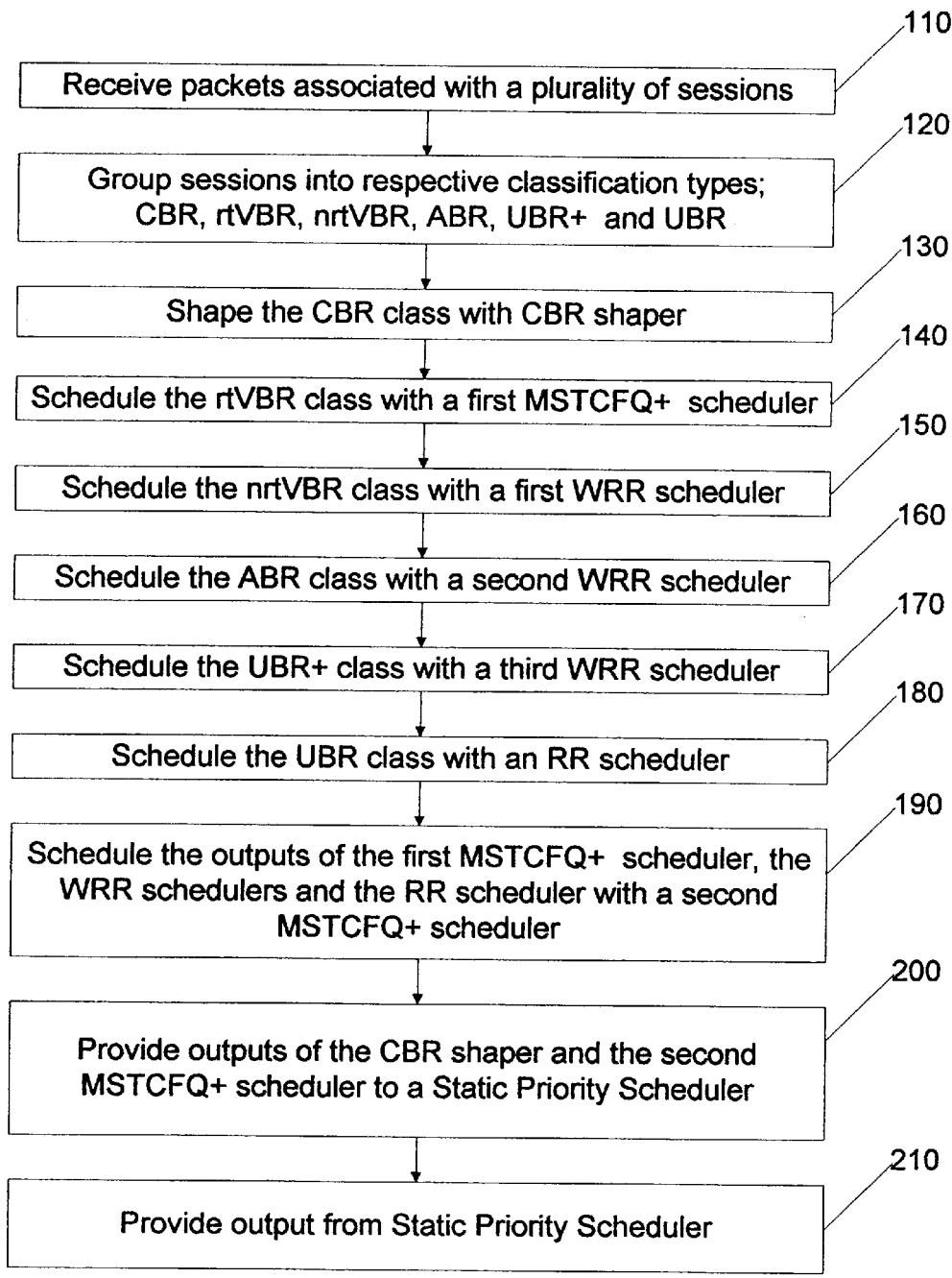
FIG. 2 is a flow chart illustrative of the method employed in the hierarchical scheduler of the present invention.

Referring to FIG. 2 the method of a particular embodiment of the present invention is shown. In the first step 110 packets providing a plurality of sessions are received. The sessions comprise various types of transmissions such as data, voice and video and may include flow-control.

The next step, 120 results in the plurality of sessions being grouped into classes according to the QoS requirements of the respective sessions. Each session is grouped into one of the CBR, rtVBR, nrtVBR, ABR, UBR and UBR+ classes.

The next step 130 provides shaping of the CBR class. As discussed above, the CBR shaper releases traffic at a controlled rate so as to exceed downstream bandwidth limitations.

As illustrated in step 140, a first MSTCFQ+ scheduler is utilized to schedule an output from the rtVBR sessions. As depicted in steps 150, 160 and 170 the nrtVBR sessions, the ABR sessions and the UBR+ sessions are scheduled with respective WRR schedulers. As shown in step 180 an RR scheduler is employed for scheduling an output from UBR sessions.

As illustrated in step 190 a second MSTCFQ+ scheduler is employed to schedule an output from among the first MSTCFQ+ scheduler, the WRR schedulers and the RR scheduler.

The next step 200 provides the CBR shaper output and the output of the second level scheduler to a static priority scheduler.

Finally, in step 210 the CBR shaper output and the second level scheduler output are prioritized to provide the hierarchical scheduler output.

The hierarchical scheduler of the present invention thus provides for management of various sessions having various requirements and characteristics in a fair, efficient and cost effective manner such that multiple sessions can be scheduled in a cell based network such as an ATM network.

Having described a preferred embodiment of the invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should be limited solely by the scope and spirit of the appended claims.

We claim:

1. A method for scheduling packet transmission in a network communication device comprising the steps of:

receiving a plurality of packets, wherein each of said packets is associated with one of a plurality of classification types;

segregating said received packets into a plurality of sessions, each of said sessions having at least one of said plurality of classification types;

forwarding said packets for each of said plurality of sessions to inputs of a corresponding plurality of first level schedulers, each of said schedulers having said input for receiving packets within respective sessions and an output, and wherein each one of said schedulers employs one of a plurality of first level scheduling protocols;

receiving packets at inputs of a second level scheduler from the outputs of at least some of said plurality of first level schedulers, wherein said second level scheduler further includes an output and is operative in accordance with a second level scheduling protocol;

forwarding packets from the output of said second level scheduler to a first input a third level scheduler, and forwarding packets from the output of at least one of said first level schedulers to a second input of said third level scheduler, wherein said third level scheduler has an output and is operative in accordance with a third level scheduling protocol; and forwarding packets from the output of said third level scheduler in accordance with said third level scheduling protocol.

2. The method of claim 1 wherein said segregating step comprises the step of segregating said packets into a plurality of sessions wherein each of said sessions is associated with one of said classification types, and each of said sessions includes packets associated with at least one of a plurality of Quality of Service ($Q_oS$) levels.

3. The method of claim 2 wherein said communication device comprises an Asynchronous Transfer Mode (ATM) switch and said plurality of $Q_oS$ levels comprise Constant Bit Rate (CBR), real time Variable Bit Rate (rtVBR), non-real time Variable Bit Rate (nrtVBR) , Available Bit Rate (ABR), Unspecified Bit Rate+(UBR+) and Unspecified Bit Rate (UBR) Quality of Service levels.

4. The method of claim 1 wherein each of said first level schedulers, said second level scheduler and said third level scheduler comprise one of a CBR shaper, a Minimum Start Time Clocked Fair Queuing Plus (MSTCFQ+) scheduler, a Weighted Round Robin (WRR) scheduler, a Round Robin (RR) scheduler and a Static Priority (SP) scheduler.

5. The method of claim 1 wherein said classification types comprise CBR, rtVBR, nrtVBR, ABR, UBR+, and UBR $Q_oS$ levels.

6. The method of claim 5 wherein said first level schedulers comprise a CBR shaper scheduler, an MSTCFQ+ scheduler, a plurality of WRR schedulers and at least one RR scheduler.

7. The method of claim 6 wherein said second level scheduler comprises an MSTCFQ+ scheduler.

8. The method of claim 7 wherein said third level scheduler comprises a Static Priority scheduler.

9. The method of claim 8 wherein said CBR shaper receives at the input of said shaper packets associated with said CBR classification type.

10. The method of claim 6 wherein said first level MSTCFQ+ scheduler receives at the input of such scheduler, packets associated with said rtVBR classification type.

11. The method of claim 6 wherein said plurality of WRR schedulers comprise first, second and third WRR schedulers.

12. The method of claim 11 wherein said inputs of first, second and third WRR schedulers receive at respective inputs packets corresponding to said nrtVBR, ABR and UBR classification types.

13. The method of claim 1 wherein said second level scheduling protocol comprises one of said first level scheduling protocols.

14. The method of claim 10 wherein said second level scheduling protocol comprises the same scheduling protocol associated with the rtVBR classification type.

15. The method of claim 1 wherein said plurality of packets comprise voice transmissions, video transmissions or data transmissions.

16. A method for scheduling packet transmission in a network communication device comprising the steps of:

receiving a plurality of packets, wherein each of said packets is associated with one of a plurality of Quality of Service (QOS) levels, said $Q_oS$ levels comprising Constant Bit Rate (CBR), real time Variable Bit Rate (rtVBR), non-real time Variable Bit Rate (nrtVBR), Available Bit Rate (ABR), Unspecified Bit Rate + (UBR+) and Unspecified Bit Rate (UBR) Quality of Service levels;

segregating said received packets into a plurality of sessions, each of said sessions having at least one of said plurality of $Q_oS$ levels;

forwarding said packets for each of said plurality of sessions to inputs of a corresponding plurality of first level schedulers, each of said schedulers having said input for receiving packets within respective sessions and an output, and wherein each one of said schedulers employs one of a plurality of first level scheduling protocols, said first level scheduling protocols comprising a CBR shaper, a Minimum Start Time Clocked Fair Queuing Plus (MSTCFQ+) scheduler, a Weighted Round Robin (WRR) scheduler, a Round Robin (RR) scheduler and a Static Priority (SP) scheduler;

receiving packets at inputs of a second level scheduler from the outputs of at least some of said plurality of first level schedulers, wherein said second level scheduler further includes an output and is operative in accordance with a second level scheduling protocol comprising a MSTCFQ+ scheduler;

forwarding packets from the output of said second level scheduler to a first input a third level scheduler, and forwarding packets from the output of at least one of said first level schedulers to a second input of said third level scheduler, wherein said third level scheduler has an output and is operative in accordance with a third level scheduling protocol comprising a Static Priority Scheduler; and forwarding packets from the output of said third level scheduler in accordance with said third level scheduling protocol.

\* \* \* \* \*

UNITED STATES PATENT AND TRADEMARK OFFICE
CERTIFICATE OF CORRRECTION

PATENT NO. : 5,850,399
DATED : December 15, 1998
INVENTOR(S) : Mahesh N. Ganmukhi, et al.

It is certified that error appears in the above-identified patent and that said Letters Patent is hereby corrected as shown below:

TITLE PAGE, ADD THE FOLLOWING:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 2 | 3 | 1 | 6 | 3 | 3 | 07/27/93 | Hluchyj et al. | | | |
| | | 5 | 4 | 5 | 5 | 8 | 2 | 5 | 10/03/95 | Lauer et al. | | | |
| | | | | | | | | | | | | | |

Signed and Sealed this

Twenty-sixth Day of October, 1999

Attest:

Attesting Officer

Q. TODD DICKINSON

Acting Commissioner of Patents and Trademarks